[11] 3,578,997

[72] Inventor Noel Felici
Grenoble, France
[21] Appl. No. 866,689
[22] Filed Oct. 15, 1969
[45] Patented May 18, 1971
[73] Assignee Tunzini-Sames
Grenoble, France
[32] Priority Oct. 21, 1968
[33] France
[31] 170,760

[54] ELECTRIC GENERATORS
9 Claims, 6 Drawing Figs.
[52] U.S. Cl. .................................................. 310/10
[51] Int. Cl. .................................................. H02n 3/00
[50] Field of Search ....................................... 310/5, 6, 10, 11; 60/202, 3; 103/1 (E)

[56] References Cited
UNITED STATES PATENTS
792,751 6/1905 Blake .......................... 310/6
2,578,908 12/1951 Turner .......................... 310/6X
3,405,291 10/1968 Brandmaier ................... 310/10
3,456,135 7/1969 Marks ........................... 310/10

*Primary Examiner*—D. X. Sliney
*Attorney*—Holcombe, Wetherill and Brisebois

ABSTRACT: This invention relates to electric generators employing a gaseous fluid, such as air, which is caused to flow through a passage at high speed. The gaseous fluid is ionized by ionizing means comprising a needle electrode and a counter electrode formed by a convergent-divergent wall portion at the upstream end of the passage, the downstream portion of the passage being formed by an electrically insulating tube. According to this invention means are provided to avoid condensation forming on the outer surface of the insulating tube. The anticondensation means may comprise either thermal insulation, around the outer surface of the insulating tube; or means for heating said outer surface, or yet again means inducing a flow of a gaseous fluid over said outer surface.

Fig. 1

Patented May 18, 1971  3,578,997

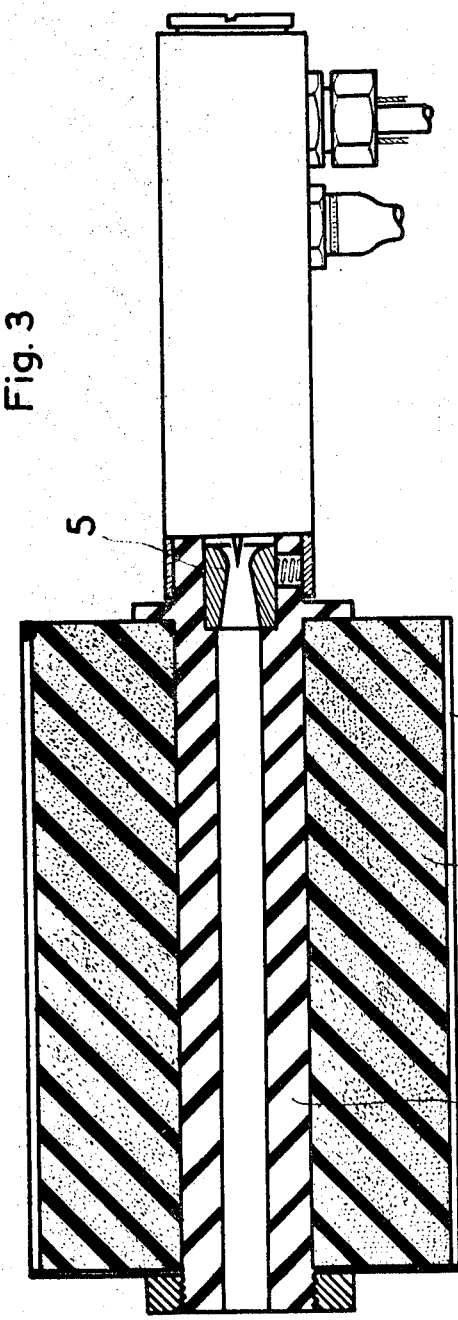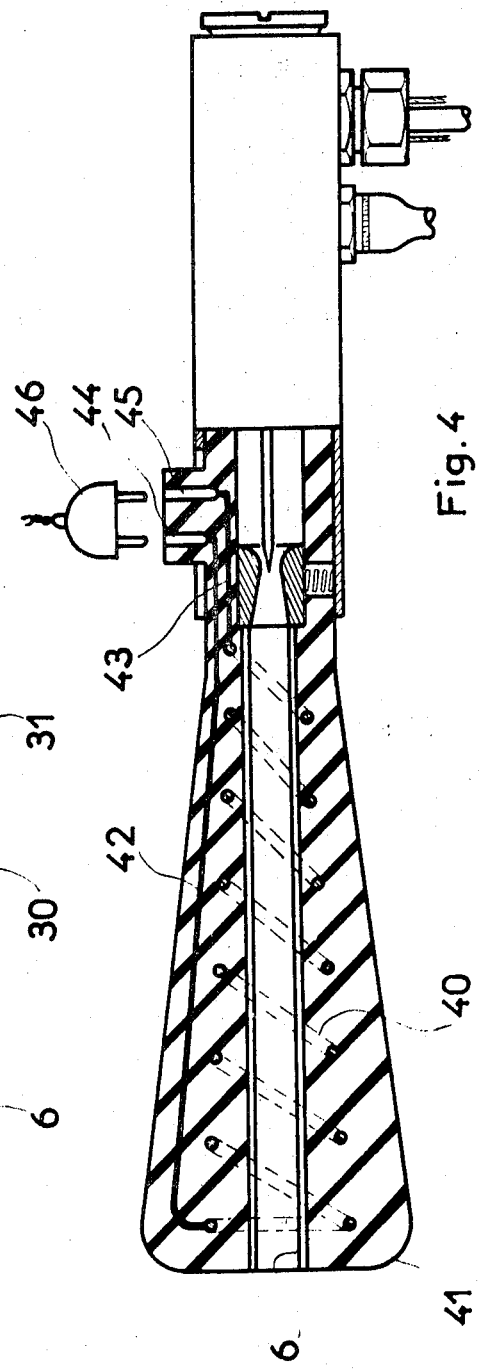

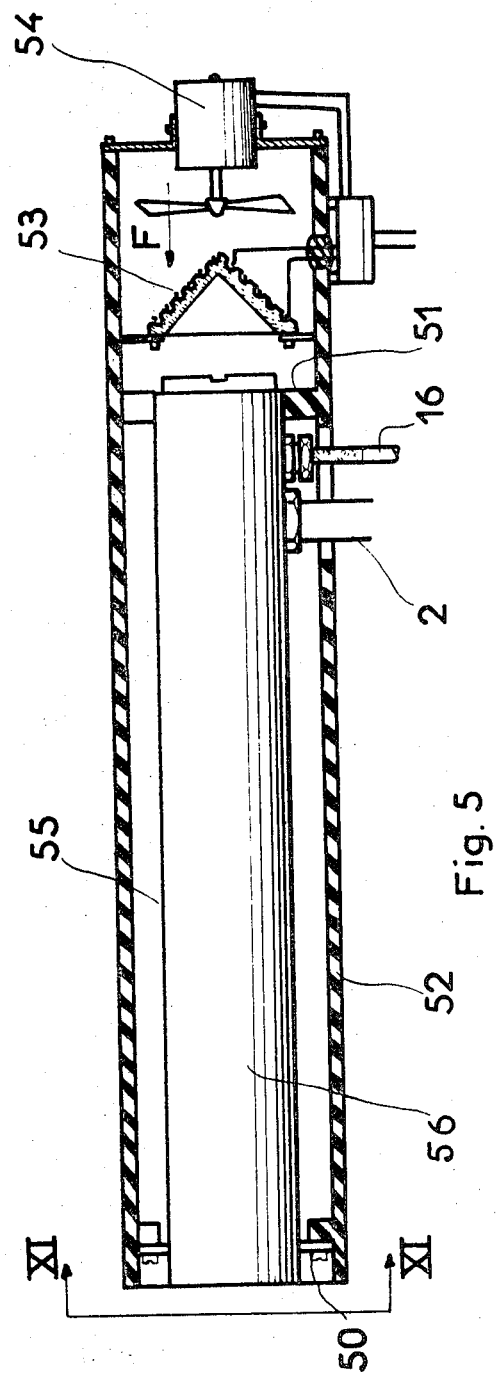
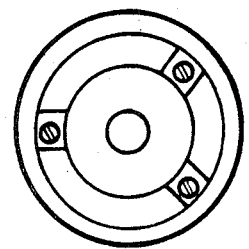

ELECTRIC GENERATORS

The present invention relates to electric generators employing a gaseous fluid such as air, comprising a passage for the gaseous fluid and having upstream of said passage an ion emitter means formed from an electrode and from a counterelectrode forming an inner wall portion of said passage. The said counterelectrode is advantageously in the form of a convergent-divergent portion and the passage may be formed by an insulating tube.

In such generators when the air expands to reach supersonic speeds in the electrically insulating passage, the temperature of this air becomes very low, usually 50° C. lower and even 100° C. lower than the initial temperature of the gas. This has the result of considerably cooling the generator passage and impairing the performance of the generator, due to the condensation of atmospheric moisture on the external surface of the insulating tube, which in turn has the effect of considerably increasing the surface conductivity and hence causes a considerable reduction of the current and voltage effectively available.

Thus a generator consuming 12 $M^3$ per hour of air at normal pressure and temperature conditions, under a pressure of 3.5 bars, and supplying a current of 11 microamps at 65 kv., loses half its voltage when it discharges into an external resistance of 6000 megohms, under very humid conditions, because of current losses at the outer surface of the insulating tube due to condensation.

The present invention has for an object to provide means for substantially reducing or eliminating this drawback. To this end, means are provided to avoid condensation forming on the outer surface of the insulating tube of the generator.

According to one embodiment of the invention, the anticondensation means comprises thermal insulation means located around the insulating tube of the generator.

According to another embodiment, the anticondensation means consist in means for inducing a flow of a gaseous fluid over the outer surface of the insulating tube of the generator.

According to yet another embodiment, the anticondensation means consist in means for heating, either directly or indirectly, at least the outer surface of the insulating tube of the generator.

The invention will now be further described, by way of example, with reference to the accompanying drawings, in which:

FIGS. 2, 3, 4 and 5 are similar views of further embodiments, and

FIG. 6 is an end view of the generator shown in FIG. 5 in the direction of the arrows VI–VI.

Figure 1:
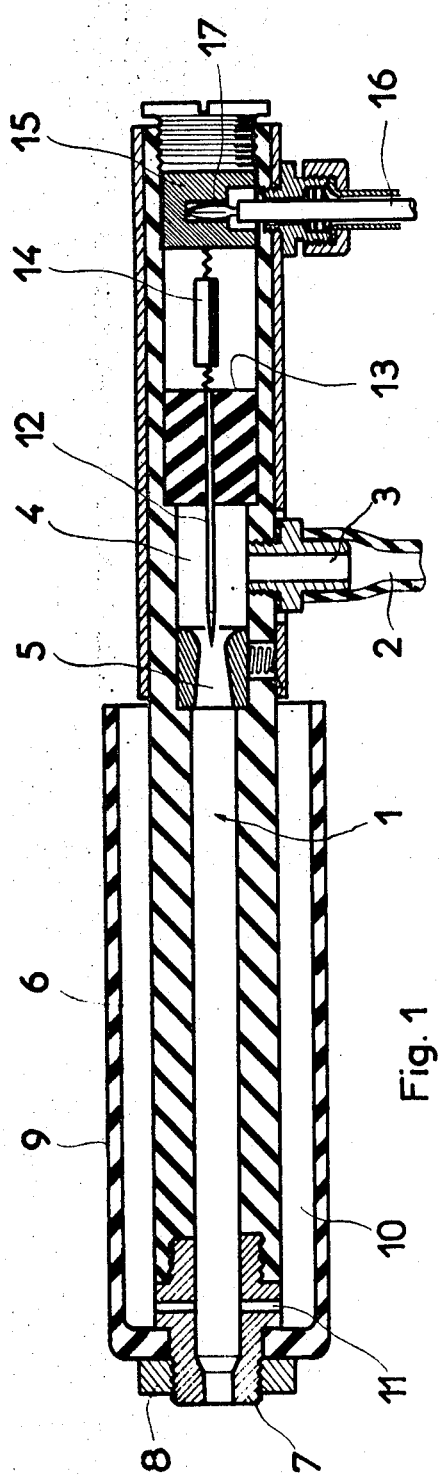
FIG. 1 is a sectional view of one embodiment of a generator according to the invention.

Referring to FIG. 1 a high voltage generator comprises an input tube 2 for air under pressure which is connected by a coupling 3 to a chamber 4. This chamber leads to a convergent-divergent passage 5 followed by an electrically insulating tube 6 defining a passage 1. A charge conductor member in the form of a bush 7 is located at the downstream end of the tube 6 and carries an insulating sleeve 9 which is fixed by means of a screw 8 to the bush 7. The sleeve 9 defines an annular passage 10 around the external surface of the tube 6 and this passage is connected to the passage 1 inside the tube 6 by radial apertures 11. The annular passage 10 is open to atmosphere at its free end, opposite to that adjacent the bush 7. The wall of the convergent-divergent passage 5 forms a counterelectrode for an ionizing needle 12 which is carried by an electrically insulating support 13 and connected to a DC voltage-source of several kilovolts through a resistor 14, a socket 15, a plug 17 and a cable 16.

The generator operates in the following manner. The ions which are emitted at the tip of the needle 12, into the stream of air or other gas flowing at high speed through the passage 5 and along the passage 1 in the tube 6, have their potential energy increased so that the collector bush 7 is carried to a higher potential.

Part of the air or gas stream escapes through the radial apertures 11 to the annular passage 10 and this diversion is assisted by the slightly convergent form of the collector bush 7. This causes an air or gas stream constantly to sweep over the outer surface of the tube 6, thus preventing the formation of any condensation thereon. In this way, even if the tube is at a very low temperature, virtually no operational disturbance of the generator occurs because of condensation phenomena and the resultant formation of a current diversion path on the outer surface of the tube 6. It will be noticed that the air stream through the annular passage 10 cannot itself induce any condensation, because it is derived from air which has itself been compressed and therefore at least partly dehumidified before sweeping over the outer surface of the tube 6.

Figure 2:
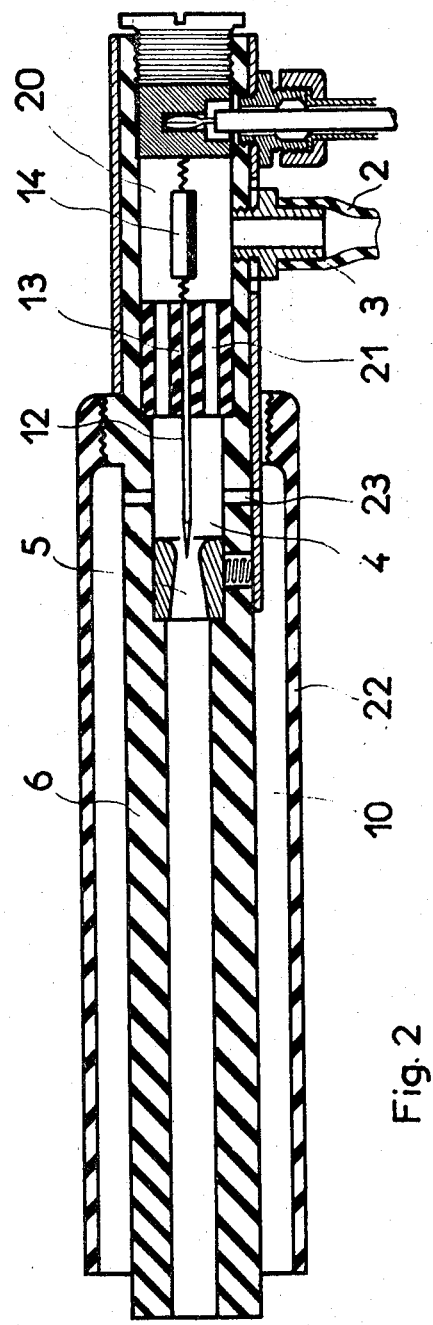

Referring now to the embodiment of FIG. 2, a basically similar arrangement of the generator is shown, with the same reference numerals used for corresponding parts. However, in this embodiment the air input tube 2 discharges into a chamber 20 containing the resistance 14 and the support 13 for the needle 12 is provided with longitudinal channels 21 to allow the circulation of the air therethrough. Moreover, in this embodiment the annular passage 10 is defined by a sleeve 22 screwed onto an upstream portion of the insulating tube 6 and communicates with the chamber 4 through radial apertures 23. The portion of air employed to sweep over the outer surface of tube 6 is thus derived at the upstream end of this tube and escapes from the downstream end at the open end of annular passage 10 parallel to the main stream emerging from passage 1.

This arrangement has the drawback of requiring more air than is actually necessary to supply the generator but, on the other hand, the outlet end of the generator may be free from any member inducing a slight pressure drop, such as the collector bush 7 of FIG. 1.

Referring now to the embodiment of FIG. 3, the generator is basically similar to the embodiment of FIG. 2, but in this embodiment, instead of providing the sleeve 22 and apertures 23, the outer surface of the tube 6 is covered with a thick layer of a foamed plastics material 30 surrounded by a casing 31. This foamed plastics material is sufficient to ensure such thermal insulation of the outer surface of the case that it does not cause any appreciable reduction in temperature which may induce condensation.

In the embodiment of FIG. 4, which again has a basically similar arrangement to that of FIG. 2, an electric resistance element 40 serving as a heater is wound around the tube 6 and this resistance is embedded in an insulator 41. It will be noted that the thickness of this insulator increases downstream towards the outlet end of the generator, since it is in this region that the potential to be insulated is at its highest. The resistance element 40 is connected by cables 42, 43 to sockets 44, 45 respectively, which receive the pins of a plug 46 connected to an electrical supply for the resistance element.

Referring now to FIGS. 5 and 6 the generator is again of basically similar construction and there is shown the tube 6 with the air input at 2 and the high voltage cable at 16. This generator is carried by crosspieces 50 and a support 51 in a case 52. A rearward portion of the case 52 houses a heating element 53 and a fan 54 which blows air in the direction of arrow F over the element 53, then into the annular passage 55 between the generator 6 and the case 52. The warm air in the passage 55 is thus blown over the outer surface of tube 6 to prevent the formation of condensation.

I claim:

1. In an electric generator employing a gaseous fluid, said generator comprising a passage for the gaseous fluid having a convergent-divergent upstream portion, an ion emitter formed from an electrode in said passage and from a counterelectrode constituting at least part of the inner wall of said convergent-divergent portion, and an insulating tube downstream of said convergent-divergent portion, which tube also constitutes part of said passage, the improvement comprising means for heating at least the outer surface of said insulating tube to avoid condensation on said outer surface.

2. In an electric generator employing a gaseous fluid, said generator comprising a passage for the gaseous fluid having a convergent-divergent upstream portion, an ion emitter formed from an electrode in said passage and from a counterelectrode constituting at least part of the inner wall of said convergent-divergent portion, and an insulating tube downstream of said convergent-divergent portion, which tube also constitutes part of said passage, the improvement comprising a tubular wall surrounding and spaced from the insulating tube and means for supplying a gas flow to the annular passage between the external surface of said insulating tube and said tubular wall to avoid condensation on the outer face of said insulating tube.

3. A generator as claimed in claim 2, wherein the gas supply is derived from the gaseous fluid fed to the generator.

4. A generator as claimed in claim 3, wherein diversion passages for the gaseous fluid are situated upstream of the insulating tube and are of a sufficiently small dimension to produce a release of the air.

5. A generator as claimed in claim 3, wherein diversion passages for the gaseous fluid are situated at the downstream end of the insulating tube.

6. A generator as claimed in claim 2, wherein the heating means consists of an electric heating element.

7. A generator as claimed in claim 6, wherein the electric heating element is enclosed in an insulating casing about the insulating tube.

8. A generator as claimed in claim 6, wherein the electric heating element is arranged in a chamber upstream of the insulating tube and heats the gas flowing over the external surface of said tube.

9. A generator as claimed in claim 8, including a fan for inducing the gas flow over the heating element and the external surface of said tube.